United States Patent [19]

Takahashi

[11] 3,778,136

[45] Dec. 11, 1973

[54] PULSE SYNCHRONIZING SYSTEM FOR MOTION PICTURE APPARATUSES

[75] Inventor: Torataro Takahashi, Gifu, Japan

[73] Assignee: Elmo Company Limited, Mizuho-ku, City of Nagoya, Aichi Prefecture, Japan

[22] Filed: Sept. 18, 1972

[21] Appl. No.: 289,882

[30] Foreign Application Priority Data

Sept. 23, 1971 Japan ................................ 46/87071

[52] U.S. Cl. ........................ 352/17, 318/74, 318/321

[51] Int. Cl. ............................................ G03b 31/04

[58] Field of Search .................. 352/17, 20; 318/74, 318/75, 321, 322

[56] References Cited

UNITED STATES PATENTS 3,674,348 7/1972 Figge et al. ........................ 325/20 X

*Primary Examiner*—Samuel S. Matthews
*Assistant Examiner*—Michael L. Gellner
*Attorney*—E. F. Wenderoth et al.

[57] ABSTRACT

A system for effecting a synchronized operation of an apparatus to be controlled relative to a reference apparatus, such as a motion picture projector and tape recorder. The apparatus to be controlled is driven by a direct current motor connected in series with a direct current source under the control of a transistor connected thereto, and the reference apparatus causes a train of turn-on pulse signals to be produced at a recurrence rate proportional to a predetermined speed of the apparatus to be controlled. The system circuit has a thyristor having a gating electrode, an anode and a cathode, the train of turn-on pulse signals being applied to the gating electrode of the thyristor to turn it on, and the above transistor being connected to the cathode of the thyristor and turned on when the thyristor is made conductive by the train of turn-on pulse signals. The apparatus to be controlled is driven only when the transistor is in the conductive state and operates a switching circuit to produce a train of turn-off pulse signals at a rate proportional to the speed thereof, so that the thyristor is turned off at intervals which are determined by one of the train of turn-on pulses and a successive one of the train of turn-off pulses.

6 Claims, 5 Drawing Figures

PULSE SYNCHRONIZING SYSTEM FOR MOTION PICTURE APPARATUSES

BACKGROUND OF THE INVENTION

This invention relates to a speed synchronizing system, and more particularly to a pulse type speed synchronizing system for two or more apparatuses such, for example, as a motion picture projector, a motion picture camera, a tape recorder, and the likes, wherein one of the apparatuses produces a train of pulse signals according to which a speed of a D.C. motor for driving the other of the apparatuses is controlled to be fully synchronized with that of one of the apparatuses.

Recently, in order to operate two or more apparatuses of the kind described in synchronism, for example, to record or reproduce sounds on a magnetic tape to be transported by a tape recorder simultaneously with recording or reproducing of picture frames on a motion picture film to be projected by a motion picture projector without employing a special electric motor such as a synchronous motor or a selsym motor, it has been the practice in the art of speed synchronization of direct current motors to employ a so-called pulse type synchronizing circuit wherein a train of pulse signals produced at the same intervals by the reference motor are adapted to be supplied to an electronic circuit for controlling the other motor to be synchronized with the reference motor.

With such pulse type synchronizing circuit, when it is desired to effect a synchronization between the two direct current motors, first the reference motor alone is brought in rotation and, on electrically connecting the reference motor with the other motor to be controlled, the motor to be controlled is caused to start to rotate by one of the train of pulse signals produced by the reference motor. This mode of the synchronization has a disadvantage that it is greatly difficult to enable the motor to be controlled to reach a speed fully synchronism with that of the reference motor in a short time because the reference motor alone has been rotated already prior to the starting of the motor to be controlled. In other words, the conventional synchronizing circuit of the type described, requires a relatively long time for the motor to be controlled to reach the synchronous speed. During such long time, a considerable discrepancy develops between, for example, the sound on the magnetic tape of the tape recorder and the picture frame on the motion picture film of the projector, and the developed descrepancy may continue through the whole operation of the electrically connected tape recorder and motion picture projector.

In order to avoid the above disadvantage, i.e., to reduce the necessary time required for effecting the synchronization between the two apparatuses, it has also been the practise to apply temporarily a relatively high level of current to a motor employed in the apparatus to be controlled substantially at the same time when the reference apparatus produces first one of the train of pulse signals to be used for controlling the apparatus to be controlled; and alternatively to preliminarily rotate the motors of the apparatuses alone prior to commencement of a synchronizing operation.

However, in the former method of removing the above disadvantage, there is still such a disadvantage that the speed of the apparatus to be controlled may exceed a synchronous speed because a load on the apparatus to be controlled is not always constant and therefore a necessary time required for enabling the apparatus to be controlled to reach the synchronous speed is not made constant. On the other hand, in the latter method, there is also still such a disadvantage of necessarily requiring an extra device such, for example, as a magnet clutch for interrupting power transmission from the motor of the apparatus to be controlled to a mechanism(s) of the apparatus to be controlled to allow only the motor of the apparatus to be in rotation. The magnet clutch is generally operated by a magnet which requires a relative high level of current because the said mechanism(s) is preferably promptly driven when the synchronizing operation starts.

It is accordingly a principal object of this invention to provide an improved pulse type synchronizing system for apparatuses, avoiding the above-mentioned disadvantages, which system includes a circuit means for temporarily applying a gradually decreasing current to a D.C. motor for the apparatus to be controlled at the starting of a synchronizing operation, thereby smoothly effecting a synchronization between the apparatuses in a short time.

It is another object of this invention to provide an improved synchronizing system for apparatuses which can maintain the apparatus in full synchronism during the whole operation of the apparatuses.

It is still another object of this invention to provide an improved synchronizing system for apparatuses which is simple in construction and inexpensive.

SUMMARY OF THE INVENTION

Briefly, this invention accomplishes the above objects by providing a system for effecting a synchronized operation between a reference apparatus and another apparatus to be controlled driven by a direct current motor connected in series with a direct current source, the reference apparatus generating a train of turn-on pulse signals at a recurrence rate proportional to a predetermined speed of the apparatus to be controlled. The system comprises a thyristor having a gating electrode, an anode and a cathode, the train of turn-on pulse signals being applied to the gating electrode of the thyristor to turn it on, and a transistor connected to the cathode of the thyristor so that it is turned on when the thyristor is made conductive by the train of turn-on pulse signals. Said another apparatus is driven only when the transistor is in the conductive state and operates a switching means to produce a train of turn-off signals at a rate proportional to the operating speed of the direct current motor of said apparatus to be controlled, the train of turn-off signals turning the thyristor off. Thus, the thyristor is in the conductive state at intervals which are determined by one of said turn-on signals and a successive one of said turn-off signals.

The system further comprises a circuit means connected between said thyristor and said transistor for temporarily applying a gradually decreasing current to the gating electrode of the transistor at the starting of a synchronizing operation. The circuit means includes a capacitor which is charged when the thyristor is in the conductive state and discharged when the thyristor is in the unconductive state, thereby to supply a current to the gating electrode of the transistor even when the thyristor is turned off. Thus, the synchronization of the apparatuses can be effected smoothly in a short time due to the presence of the gradually decreasing current.

BRIEF DESCRIPTION OF THE DRAWINGS

The invention will become more readily apparent from the following detailed description taken in conjunction with the accompanying drawings in which.

DETAILED DESCRIPTION OF THE PREFERRED EMBODIMENT

Figure 1:
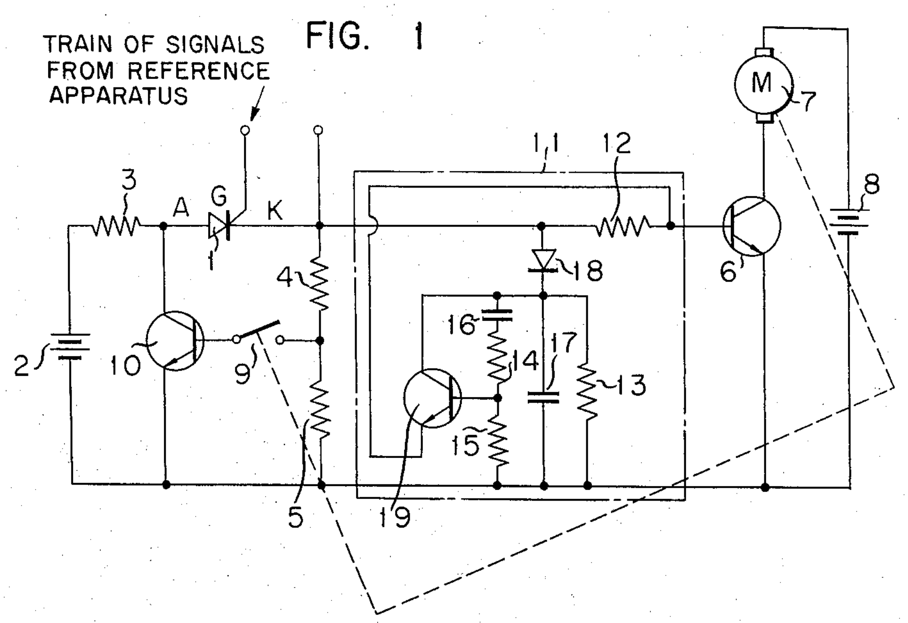
FIG. 1 is a wiring diagram of a synchronizing circuit embodying the present invention.

Referring now to the drawings, FIG. 1 is a wiring diagram showing a pulse type synchronizing system for enabling two apparatuses such a motion picture apparatus and a sound apparatus (not shown) to be operated in full synchronism, one of the apparatuses being a reference tape recorder, and the other a motion picture projector to be operated in full synchronism with the reference tape recorder. In the example, the tape speed of the tape recorder is the reference speed and a direct current motor 7 for the motion picture projector is a motor to be synchronized with the tape recorder in such a manner that the direct current motor 7 follows accurately the variations in the tape speed of the tape driven by a motor (not shown) for the tape recorder.

The circuit for such system comprises a thyristor 1 having a gating electrode G connected to means (not shown) for reproducing a train of recorded signals previously recorded on a length of magnetic tape at a recurrence rate proportional to the projection speed of a length of film to be driven by the motor 7 of the motion picture projector. There is also connected across an anode A and a cathode K of the thyristor 1 and through a registor 4 and a transistor 10 a mechanical switching means 9. The switch 9 is adapted to be closed at a rate proportional to the operating speed of the motor 7, in any conventional manner as well known by those skilled in the art. Both the thyristor 1 and the switch 9 produce a train of signals at the same rate of, for example, 18 times per second when the tape recorder and the projector are being driven in synchronous relation at their normal speed of, for instance, 4.8 centimeter per second and 18 frames per second, respectively.

Figure 2:
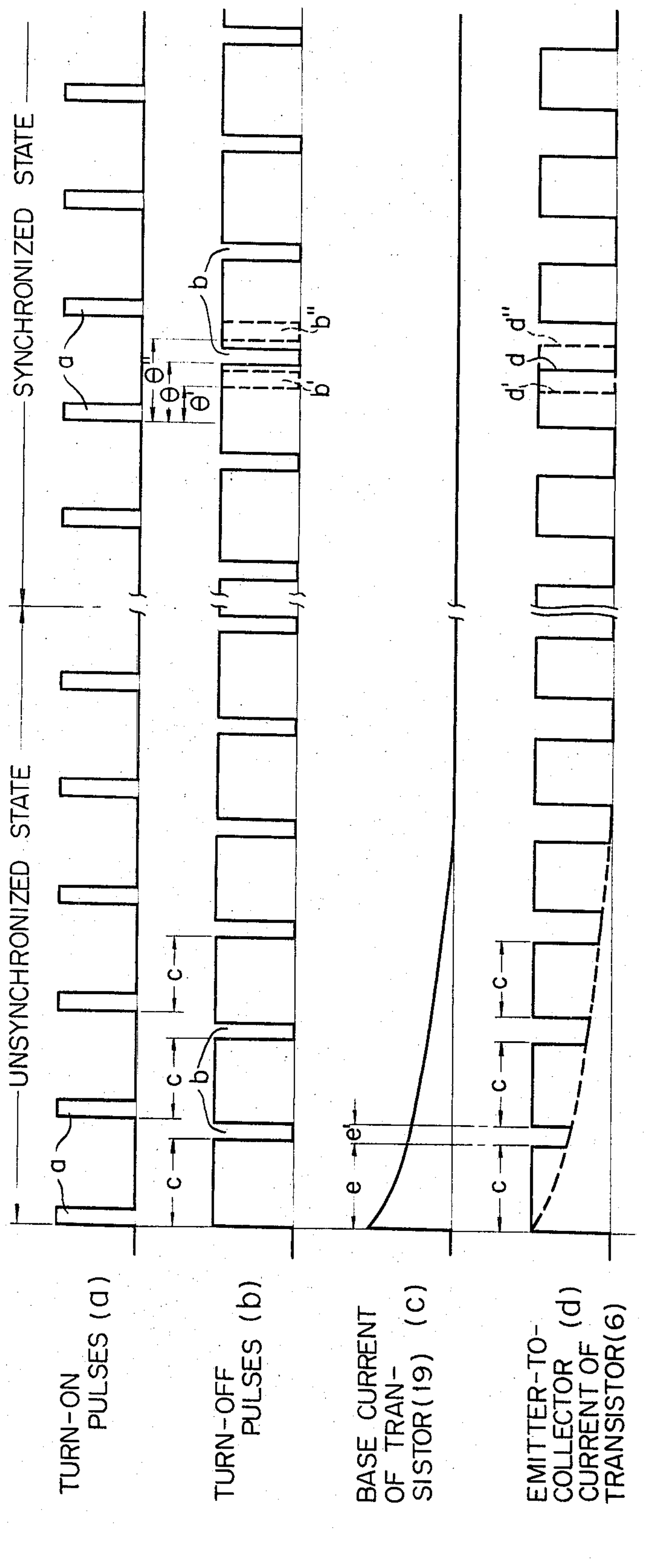
FIG. 2*a* is a waveform of turn-on pulse signals produced by a reference apparatus.
FIG. 2*b* is a waveform of turn-off signals developed in response to rotation of an apparatus to be synchronized with the reference apparatus.
FIG. 2*c* is a waveform of current applied to the base of a transistor of a circuit means for promoting a synchronization between the apparatuses, which waveform is a combination of charging and discharging curves developed by the circuit means.
FIG. 2*d* is a current waveform supplied to the direct current motor for the apparatus to be controlled.

It is to be understood that the aforementioned signal reproducing means produces, when a length of tape started to move responsive to the starting of the motor for the tape recorder, a train of rectangular turn-on pulse signals *a* as shown in FIG. 2*a*, each pulse signal having a pulse width sufficient to turn the thyristor 1 to the conductive state. Each pulse signal is amplified to an amplitude sufficient to turn the thyristor 1 on, if necessary. The transistor 10 also produces, when the motor 7 is being driven, a train of rectangular turn-off pulse signals *b* as shown in FIG. 2*b*, each pulse signal having a pulse width sufficient to turn the thyristor 1 to the nonconductive state.

A source 2 of direct current for energizing the thyristor 1 is connected across the transistor 10 through a resistor 3. A resistor 5 is connected in series to the registor 4. The cathode K of the thyristor 1 is connected through a registor 12 to the gating electrode of a transistor 6 which is, in turn, connected between the motor 7 and a source 8 of direct current so that when the transistor 6 is in the conductive state the source 8 applies to the motor 7 energizing power under the control of the transistor 6.

In addition, a circuit means 11 is provided in the circuit between the thyristor 1 and the transistor 6 for the purpose of shortening a necessary time required to fully synchronize the motion picture projector with the tape recorder. The circuit means 11 comprises a diode 18, a capacitor 17 connected in series with the diode 18, a registor 13 connected in parallel to the capacitor 17, a series circuit connected in parallel to the capacitor 17 and consisting of a capacitor 16, and registors 14 and 15, and a transistor 19 having a gate connected to a junction between the registors 14 and 15, a collector and an emitter connected across the registor 12. Thus, the output of the transistor 19 can be applied to the base electrode of the transistor 6.

In operation, the recorded signals *a* recorded at predetermined intervals on the length of the magnetic tape which is transported by the tape recorder are picked up as well-known in the art by, for example, a magnetic head (not shown) and supplied to the synchronizing system between the gate G and cathode K of the thyristor 1. An initial turn-on pulse signal, having a waveform as shown in FIG. 2*a*, causes the thyristor 1 to turn to the conductive state. This allows the flowing of the current from the power source 2 through the registor 3, the thyristor 1, and the registor 12 to the base electrode of the transistor 6 to turn the latter on. At the same time, the current passed the thyristor 1 branches off from a main line toward the diode 18 in the circuit means 11 for promoting the synchronization between the tape recorder and the motion picture projector and hence flows to the capacitor 17 to charge it during the conductive state of the thyristor 1. As will be understood, the capacitor 17 charged with such current will cause the capacitor 16 connected in parallel thereto to be also charged. While charging the capacitor 16, a gradually decreasing current *e* flows through the registor 14 and is divided into two parts directed toward the transistor 19 and the registor 15 respectively. The current part directed toward the transistor 19 is applied to the base electrode thereof as a base current to turn it on. Thus, it is apparent that an output current from the cathode of the transistor 19 is added to the aforementioned current through the thyristor 1. The turned-on transistor 6 allows driving power to be supplied from the source 6 to the motor 7 to rotate the latter, whereby the switch 9 is closed and the transistor 10 is turned on, resulting in an application of a turn-off pulse signal *b* to the thyristor 1. When the thyristor 1 is in the nonconductive state, the source 2 supplies no current to the base electrode of the transistor 6, but the circuit means 11 provides the base electrode of the transistor with a gradually decreasing discharging current *e'* because the capacitors 16 and 17 of the circuit means are being discharged during the turned-off state of the thyristor 1. Such on and off operation is repeated.

Therefore, it will be apparent for those skilled in the art that the current applied to the base electrode of the transistor 6 by the circuit means 11 during a synchronizing operation has a current waveform as shown in FIG. 2*c*, which gradually decreases in magnitude and becomes nil when the charging of the capacitors 16 and 17 is completed.

Even when the base current applied to the transistor 6 is thus increased by adding the output current from the transistor 19 to the current from the thyristor 1, the current flowing through the motor 7 does not increase because the transistor 6 is adapted to become in saturation only by the current from the thyristor 1. However, when the thyristor 1 is made nonconductive, as described above, due to one of the train of turn-off pulse signals generated by the mechanical switch 9, the motor 7 will be energized by a current of such a level as corresponding to the level of the output current of the transistor 19 since only the output current of the transistor 19 is allowed to be applied to the base electrode of the transistor 6 as will be understood by viewing FIG. 2*c*. Therefore, at the starting of the synchronizing operation, the motor 7 can be rotated unceasingly regardless of whether or not the thyristor 1 is in the conductive state and can reach a normal high speed in a short time. At the beginning of rotation of the motor 7, an interval between the subsequent turn-off pulse signals *b* generated by the motor 7 is relatively long since the motor speed is increasing to the predetermined high level. That is, an interval *c* (FIG. 2*b* and 2*d*) between one of the turn-on pulse signals *a* and a successive one of turn-off pulse signals *b* is relatively long.

Since the interval *c* is made short gradually according to the increase of speed of the motor 7, the base current having a waveform shown in FIG. 2*c* can be applied to the base electrode of the transistor 19 and accordingly the current having a waveform shown in FIG. 2*d* flows through the motor 7, with the result that the motion picture projector can be fully synchronized in a minimum time.

After the speed of the motor 7 has reached the predetermined level, i.e., when the system is in the synchronized state shown on the right-hand side of FIGS. 2*a*, 2*b*, 2*c* and 2*d*, it is of course the fact that the thyristor 1 is also made conductive by means of the trains of turn-on pulse signals *a* to allow the current from the power source 2 to be supplied to the base of the transistor 6, thereby energizing the motor 7 to drive at the predetermined speed. The switch 9 is operatively connected to part of a projector operating mechanism (not shown) driven by the motor 7 such that it alternately opens and closes in proportion to the number of rotations of the motor 7. On the right-hand side of FIG. 2*b* showing the synchronized state of the system, after a "$\theta$" interval of time from the occurrence of one turn-on pulse signal *a*, the switch 9 is closed. Substantially simultaneously with the closure of the switch 9, the current originating from the battery 2 also flows through the registor 4 and the closed switch 9 to the base of the transistor 10, thereby bringing it in the conductive state. This causes the thyristor 1 to be made nonconductive and the transistor 6 to be also made nonconductive accordingly since there is no current originating from the circuit means 11 to the base electrode of the transistor 6 as shown in FIG. 2*c*, with the result that the current flowing through the motor 7 is shut off. The motor 7 is caused to be re-energized when the next turn-on signal recorded on the tape is received by the thyristor 1. As described hereinbefore, the energization of the motor 7 can be effected each time the turn-on signals are successively applied to the thyristor 1.

As is well known in the art, a motor, including the motor 7 for the projector, tends by nature to increase in speed beyond the synchronous speed if it has driving power sufficient to overcome any variation in load applied thereto and/or variation in the voltage of the power source 6. In the event of such further increase of speed of the motor 7, the turn-off pulse signal *b* advances as shown in dotted lines and indicated by the character *b'* in FIG. 2*b*. Accordingly, the phase difference between the turn-on pulse signal *a* and the turn-off pulse signal is changed from $\theta$ to $\theta'$, so that it will be understood from FIG. 2*d* that the amount of current flowing through or supplied to the motor 7 is reduced from *d* to *d'*, with the result that the speed of the motor 7 is reduced and it is driven at the synchronous speed.

In contrast to the above, in the event that the speed of the motor 7 falls below the synchronous speed for any reason such as a voltage drop, the turn-off pulse signal *b* is caused to lag and approaches a position remote from the turn-on pulse signal *a*, the lagging pulse signal being shown in dotted lines and indicated by the character *b''* in FIG. 2*b*, so that the current flowing through or supplied to the motor 7 is increased from *d* to *d''*, resulting in the establishment of the synchronous operation of the motion picture projector with the tape recorder.

In view of the foregoing, it will be understood that, according to the present invention, an ideal synchronization between the motion picture apparatuses, for example, the tape recorder and the motion picture projector can be accomplished even if a variation in speed of the motor 7 and/or the motor for tape recorder occurs. For instance, upon the occurrence of a variation in the speed of the motor 7 due to a variation, e.g., such as a variation in the load applied thereto and/or the voltage of the power source 6, the phase $\theta$ of the turn-off pulse signal *b* is caused to advance or lag in proportion to the variation of speed of the motor 7, whereupon the current supplied to the motor 7 is automatically controlled in the previously described manner to effect the synchronization between the motion picture projector and the tape recorder.

From the foregoing description, it will be apparent that the present invention provides a synchronizing system for apparatuses wherein a circuit means for quickening synchronization between the apparatuses is involved to effect the quick, smooth, and sure synchronizing operation of the motion picture apparatuses.

While the invention has been illustrated and described with reference to a single preferred embodiment thereof, it is to be understood that various changes in the details of constructions and the arrangement and combination of parts may be made without departing from the spirit and scope of the invention.

I claim:

1. A system for synchronizing an apparatus, which is driven by a direct current motor connected in series with a direct current power source, with another reference apparatus which generates a train of turn-on pulse signals at a rate proportional to the speed of said reference apparatus, said system comprising a circuit including;

a. a thyristor having a gating electrode, an anode and a cathode, said gating electrode receiving said train of turn-on pulse signals produced by said reference apparatus to turn said thyristor to a conductive state;

b. a power source for energizing said thyristor;

c. a pulse producing means having a switching means for producing a train of turn-off pulse signals at a rate proportional to a speed of said direct current motor to turn said thyristor to a nonconductive state, whereby said thyristor is in the conductive state at intervals which are determined by one of said train of turn-on pulse signals and a successive one of said train of turn-off pulse signals;

d. a transistor having a base electrode connected with the cathode of said thyristor, said transistor having said power source for energizing said thyristor connected on an input side thereof, and having said direct current motor and said power source for said direct current motor connected on an output side thereof; and e. a circuit means connected between said thyristor and said transistor for providing the base electrode of said transistor with a gradually decreasing current at a starting of synchronizing operation; in addition to a current which normally applied to the base electrode of said transistor when said thyristor is in the conductive state, thereby to quickly increase the speed of said direct current motor and effecting the full synchronization between said apparatuses.

2. A system as set forth in claim 1, wherein said circuit means comprises at least one capacitor which is charged when said thyristor is in the conductive state and discharged when said thyristor is in the nonconductive state so that said gradually decreasing current is applied to the base electrode of said transistor even when said thyristor is not in the conductive state.

3. A system as set forth in claim 2, wherein said circuit means comprises a transistor having a cathode connected to the base electrode of said transistor connected to the cathode of said thyristor, whereby a charging current and a discharging current of said at least one capacitor flow into the base electrode of said transistor connected to the cathode of said thyristor.

4. A system as set forth in claim 2, wherein said circuit means comprises a resistor connected in parallel to said at least one capacitor.

5. A system as set forth in claim 1, wherein said pulse producing means comprises a transistor connected across said power source for energizing said thyristor and connected to said switching means.

6. A circuit for synchronizing a motion picture projector driven by a direct current motor, which is connected in series with a direct current power source, with a tape recorder transporting a length of magnetic tape on which signals are recorded at a recurrence rate proportional to the projection speed of a length of motion picture film to be projected by said motion picture projector, said circuit comprising;

a. a thyristor having a gating electode, an anode, and a cathode, said recorded signals on said magnetic tape being applied, after reproduced, to said gating electrode of said thyristor as a train of turn-on pulse signals to turn the thyristor on;

b. a power source for energizing said thyristor;

c. a switching means connected to said anode and cathode of said thyristor and operatively coupled to be closed by said projector at intervals proportional to the speed of said projector for applying a train of turn-off pulse signals to said thyristor at a rate proportional to the operating speed of said direct current motor, whereby said thyristor is in the conductive state at intervals which are determined by one of said train of turn-on pulse signals and a successive one of said train of turn-off pulse signals;

d. a transistor having a base electrode connected with the cathode of said thyristor, said transistor having said power source for energizing said thyristor connected on an input side thereof, and having said direct current motor and said power source for said direct current motor connected on an output side thereof; and e. a circuit means connected between said thyristor and said transistor for providing the base electrode of said transistor with a gradually decreasing current at a starting of synchronizing operation, in addition to a current which is normally applied to the base electrode of said transistor when said thyristor is in the conductive state; said circuit means comprising 1. at least one capacitor which is charged when said thyristor is in the conductive state and discharged when said thyristor is not in the conductive state;
2. a transistor having a cathode connected to the cathode of said thyristor, thereby applying a charging current and a discharging current of said at least one capacitor to the base electrode of said transistor connected to the cathode of said thyristor; and
3. a resistor connected in parallel to said at least one capacitor.

* * * * *